(12) United States Patent
Clouse et al.

(10) Patent No.: US 12,472,665 B2
(45) Date of Patent: Nov. 18, 2025

(54) MOLDED SOLID SURFACES INCLUDING FERROUS MATERIAL

(71) Applicant: Kohler Co., Kohler, WI (US)

(72) Inventors: Kathryn L. Clouse, Howards Grove, WI (US); Mark Schibur, Sheboygan, WI (US); John O. Lipinski, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 78 days.

(21) Appl. No.: 18/107,351

(22) Filed: Feb. 8, 2023

(65) Prior Publication Data
US 2023/0264395 A1 Aug. 24, 2023

Related U.S. Application Data

(60) Provisional application No. 63/311,633, filed on Feb. 18, 2022.

(51) Int. Cl.
*B29C 45/00* (2006.01)
*B29C 45/04* (2006.01)
*B29C 45/14* (2006.01)

(52) U.S. Cl.
CPC ...... *B29C 45/0013* (2013.01); *B29C 45/0055* (2013.01); *B29C 45/04* (2013.01);
(Continued)

(58) Field of Classification Search
CPC . B29C 45/0013; B29C 45/0055; B29C 45/04; B29C 45/14778; B29C 2791/004; B29C 70/882; B29C 70/64; B29K 2903/06; B29K 2995/0008; B29K 2995/0026; B29K 2105/203; B29K 2505/00; B44C 1/00
See application file for complete search history.

(56) References Cited

U.S. PATENT DOCUMENTS

| 5,145,614 A | 9/1992 | Kuroda |
| 5,785,913 A | 7/1998 | Clark, Jr. et al. |

(Continued)

FOREIGN PATENT DOCUMENTS

| CN | 101400495 A | 4/2009 |
| CN | 101092529 B | 7/2010 |

(Continued)

OTHER PUBLICATIONS

Machine English translation of JPS59230714, Accessed Feb. 19, 2025 (Year: 1984).*

(Continued)

*Primary Examiner* — Abbas Rashid
*Assistant Examiner* — Adrianna N Konves
(74) *Attorney, Agent, or Firm* — Lempia Summerfield Katz LLC

(57) ABSTRACT

A method of manufacturing a molded solid surface includes mixing ferrous particles into a resinous material, injecting the resinous material including the ferrous particles into a mold, the mold including an upper mold half and a lower mold half, creating a predetermined pattern in the resinous material by applying a force to the ferrous particles in the resinous material toward a surface of the upper mold half or the lower mold half using one or more magnets, and curing the resinous material in the mold into the molded solid surface.

20 Claims, 13 Drawing Sheets

(52) U.S. Cl.
CPC .. *B29C 45/14778* (2013.01); *B29C 2791/004* (2013.01); *B29K 2903/06* (2013.01); *B29K 2995/0008* (2013.01); *B29K 2995/0026* (2013.01)

(56) References Cited

U.S. PATENT DOCUMENTS

| | | | |
|---|---|---|---|
| 6,605,661 | B2 | 8/2003 | Hamami |
| 8,354,145 | B2 | 1/2013 | De Rydt et al. |
| 8,696,031 | B2 | 4/2014 | Despland et al. |
| 8,895,133 | B2 | 11/2014 | Nesbitt |
| 9,199,502 | B2 | 12/2015 | Degott et al. |
| 9,724,956 | B2 | 8/2017 | Schmid et al. |
| 9,731,456 | B2 | 8/2017 | Kushalappa et al. |
| 9,834,028 | B2 | 12/2017 | Degott et al. |
| 9,849,713 | B2 | 12/2017 | Schmid et al. |
| 10,052,903 | B2 | 8/2018 | Loginov et al. |
| 10,279,618 | B2 | 5/2019 | Degott et al. |
| 10,328,739 | B2 | 6/2019 | Loginov et al. |
| 10,500,889 | B2 | 12/2019 | Li et al. |
| 10,610,888 | B2 | 4/2020 | Nikseresht Ghanepour et al. |
| 10,737,526 | B2 | 8/2020 | Loginov et al. |
| 10,780,456 | B2 | 9/2020 | Kim |
| 10,850,305 | B2 | 12/2020 | Loginov et al. |
| 10,906,066 | B2 | 2/2021 | Loginov et al. |
| 10,933,442 | B2 | 3/2021 | Schmid et al. |
| 10,981,401 | B2 | 4/2021 | Loginov et al. |
| 11,065,906 | B2 | 7/2021 | Amerasinghe et al. |
| 2006/0000788 | A1* | 1/2006 | Sholem .................. B25H 3/04 211/70.6 |
| 2007/0251603 | A1 | 11/2007 | Olson |
| 2009/0057603 | A1 | 3/2009 | Tomiyama et al. |
| 2013/0056672 | A1* | 3/2013 | Johnston ............... C22C 47/025 252/62.51 R |
| 2013/0309488 | A1 | 11/2013 | Fukami et al. |
| 2013/0320024 | A1 | 12/2013 | Perillon et al. |
| 2015/0217594 | A1 | 8/2015 | Pieters et al. |
| 2015/0296936 | A1 | 10/2015 | Demange et al. |
| 2017/0239853 | A1* | 8/2017 | Emrich ................... B29C 41/20 |
| 2017/0305184 | A1 | 10/2017 | Muller |
| 2018/0243956 | A1 | 8/2018 | Salenius |
| 2019/0217335 | A1 | 7/2019 | Nikseresht Ghanepour et al. |
| 2020/0017737 | A1 | 1/2020 | Roosen |
| 2020/0215844 | A1 | 7/2020 | Amerasinghe et al. |
| 2020/0254484 | A1 | 8/2020 | Amerasinghe et al. |
| 2020/0346479 | A1 | 11/2020 | Schmid et al. |
| 2021/0024759 | A1 | 1/2021 | Robinson et al. |
| 2021/0088959 | A1 | 3/2021 | Schmid et al. |
| 2021/0245197 | A1 | 8/2021 | Amerasinghe et al. |
| 2021/0308718 | A1 | 10/2021 | Nikseresht Ghanepour et al. |
| 2021/0319937 | A1 | 10/2021 | Nikseresht Ghanepour et al. |

FOREIGN PATENT DOCUMENTS

| | | |
|---|---|---|
| DE | 2010831 A1 | 9/1971 |
| JP | S5621817 A | 2/1981 |
| JP | S5763234 A | 4/1982 |
| JP | S59230714 A | 12/1984 |
| JP | 2009007800 A | 1/2009 |
| WO | 2018234659 A1 | 12/2018 |
| WO | 2019215148 A1 | 11/2019 |
| WO | 2020025218 A1 | 2/2020 |
| WO | 2020025482 A1 | 2/2020 |
| WO | 2020160993 A1 | 8/2020 |
| WO | 2020193009 A1 | 10/2020 |

OTHER PUBLICATIONS

Extended European Search Report from European Patent Application No. 23156148.1, dated Jul. 20, 2023, 8 pages.

Chinese Office Action from Chinese Patent Application No. 2025041100011940, dated Apr. 11, 2025, 15 pages (including English summary).

* cited by examiner

First State

Second State

Third State

MOLDED SOLID SURFACES INCLUDING FERROUS MATERIAL

CROSS-REFERENCE TO RELATED APPLICATIONS

This application claims priority benefit of Provisional Application No. 63/311,633 filed Feb. 18, 2022, which is hereby incorporated by reference in its entirety.

FIELD

The present application relates to magnetic apparatuses for use in a bathroom or kitchen setting.

BACKGROUND

A magnet is a material or object that creates a magnetic field. A permanent magnet is an object or material that is magnetized and creates its own magnetic field. A temporary magnet only maintains its magnetic field at certain times such as when in the presence of a permanent magnetic field or electric current. An electromagnet may create a magnetic field only at such time such as when it is connected to an electrical current. Although ferromagnetic materials (e.g., iron, nickel, cobalt) are the only materials attracted to a magnet strongly enough to be considered magnetic, other substances respond weekly to a magnetic field. These other substances may include objects less traditionally viewed as magnetic such as wood, water, and particles suspended in water. Typically, magnetic fields have no impact on non-ferromagnetic materials; however, small forces applied in specific situations may provide useful features in the following embodiments.

BRIEF DESCRIPTION OF THE DRAWINGS

Exemplary embodiments are described herein with reference to the following drawings, according to an exemplary embodiment.

DETAILED DESCRIPTION

The following embodiments include magnetic based devices, systems, and techniques applicable in a bathroom setting or a kitchen setting. Various embodiments are described and illustrated separately. However, each of these embodiments are usable together in a single implementation, device, or system. It should be understood that the present disclosure is not limited to the details and methodology set forth in the detailed description or illustrated in the figures. It should be understood that the terminology used herein is for the purpose of description only and should not be regarded as limiting.

When a component, element, device, or the like of the present disclosure is described as having a purpose or performing an operation, function, or the like, the component, device, or element should be considered herein as being "configured to" meet that purpose or to perform that operation or function.

Natural and engineered stone surfaces have desirable aesthetics including natural veins and distinct geometric patterns. However, natural and engineered stone surfaces are expensive. Production of natural stone surfaces requires access to stone quarries and stone surfaces are limited to flat surfaces that must be sealed. Additionally, production of natural and engineered stone surfaces requires the use of expensive specialized equipment. Accordingly, there exists a need for inexpensive solid surface products having desirable aesthetics.

Described herein are apparatuses including a molded solid surface and ferrous particles and methods of manufacturing molded solid surfaces including ferrous particles. More specifically, the present disclosure describes methods of manufacturing molded solid surfaces including ferrous particles, wherein a predetermined pattern and/or a docking location are created in the molded solid surface by applying a force to the ferrous particles using a localized magnetic field (i.e., one or more permanent magnets, temporary magnets, electromagnets, and the like). Any magnets described in the disclosure may be neodymium, electromagnets, or another type of magnet. The apparatuses including a molded solid surface and ferrous particles may provide a solid surface with desirable aesthetics. The apparatuses may provide less expensive alternatives to natural and engineered stone surfaces.

Figure 1:
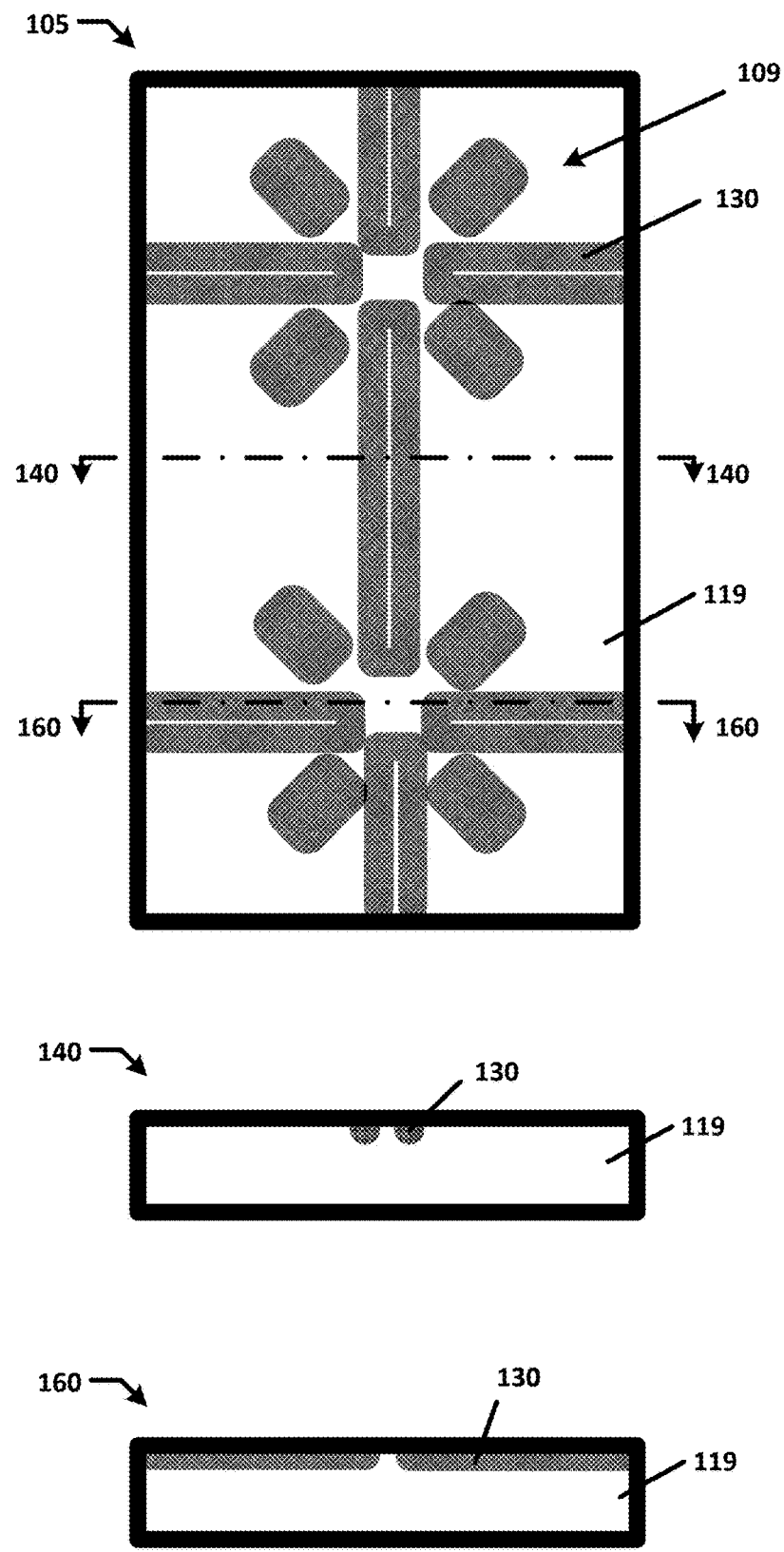
FIG. 1 illustrates an apparatus including a molded solid surface and ferrous material according to an exemplary embodiment of the present disclosure.

FIG. 1 illustrates an apparatus including a molded solid surface and ferrous particles according to an exemplary embodiment of the present disclosure. FIG. 1 illustrates a front view of an apparatus 105 comprising a molded solid surface 119 and ferrous particles 130 injection molded within a portion of the molded solid surface 119 formed of resinous material. In other embodiments, the molded solid surface 119 including ferrous particles 130 may be manufactured using compression molding, resin transfer molding (RTM), gravity casting, extrusion, pultrusion, and the like. In embodiments, where the ferrous particles 130 are injection molded within the molded solid surface 119, the ferrous particles 130 may be mixed with the resinous material and injected into a mold. The ferrous particles 130 may be drawn to a surface of the mold with a magnet before the resinous material is cured into the molded solid surface 119. In embodiments where the molded solid surface is manufactured using extrusion or pultrusion, the ferrous particles may be drawn to a surface of the extruded or formed material (e.g., a solid surface of the extruded or formed material). In some embodiments and as illustrated in FIG. 1, the ferrous particles 130 may create a predetermined pattern 109 in the molded solid surface 119. In other embodiments, the ferrous particles 130 may create a docking location in the molded solid surface 119. The docking location may be configured to secure an accessory including a magnet to the molded solid surface 119.

The molded solid surface 119 as illustrated in FIG. 1 is a planar surface. The molded solid surface as illustrated in FIG. 1 may be one of a countertop, tile, wall (e.g., a shower wall), and a floor. In other embodiments, the molded solid surface 119 is not a planar surface. For example, the molded solid surface 119 may be one of a sink, a toilet, and a faucet. The molded solid surface 119 may be any solid surface manufactured by molding a resinous material.

The portion of the molded solid surface 119 in which the ferrous particles 130 are injection molded comprises a resinous material. The resinous material may be an acrylic, polyester, urethane, epoxy, or hybrid composite, or other suitable resin. The apparatus 105 illustrates the portion of the molded solid surface 119 comprising resinous material in a state in which the resinous material has cured into a solid surface. In some embodiments, the resinous material may be a transparent or semitransparent material when cured. In other embodiments, the resinous material may be opaque when cured. In some embodiments, resinous material may include a colorant such that the resinous material has a colored appearance when cured. The resinous material may be configured to provide a desired exterior finish when cured.

The ferrous particles 130 in the portion of the molded solid surface 119 comprised of resinous material may be ferromagnetic particles. The ferrous particles may be one of iron, nickel, cobalt, and their alloys. In some embodiments, the ferrous particles 130 may be iron dust. In some embodiments, the ferrous particles 130 may be recovered from a manufacturing waste stream of another product. For example, the ferrous particles 130 may be recovered from a foundry waste stream.

The predetermined pattern 109 formed by the ferrous particles 130 in the portion of the molded solid surface 119 formed of a resinous material is an intentional manipulation of the location of the ferrous particles 130 within the resinous material. The predetermined pattern 109 may create an aesthetic design in the molded solid surface. In some embodiments the predetermined pattern 109 may be a repeating pattern on the molded solid surface. However, the predetermined pattern 109 does not need to be a repeating pattern.

A cross section of the apparatus 105 taken along line 140 is illustrated. The ferrous material 130 is located near a surface of the molded solid surface 119. The ferrous material 130 located near the surface of the molded solid surface may create the predetermined pattern 109 in the molded solid surface. The ferrous particles 130 may be visible through the transparent or semitransparent cured resinous material allowing a user to see the predetermined pattern 109.

A cross section of the apparatus 105 taken along like 160 is illustrated. The ferrous particles 130 located near a surface of the molded solid surface 119. The cross section 160 is at a different location along the apparatus 105 where the ferrous particles 130 forming the predetermined pattern 109 are present at locations different than those illustrated with respect to cross section 140.

Figure 2:
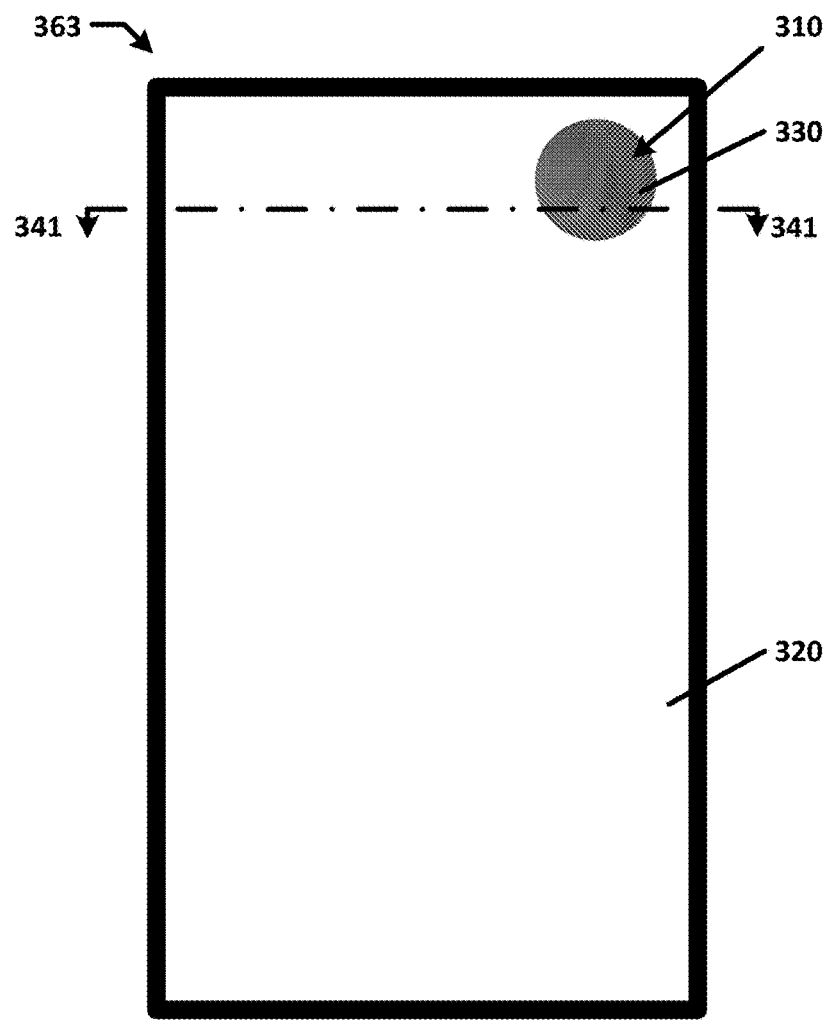
FIG. 2 illustrates an apparatus including a molded solid surface and ferrous material according to an exemplary embodiment of the present disclosure.
Figure 2:
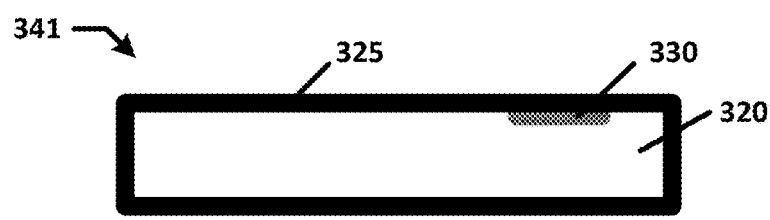

FIG. 2 illustrates an apparatus 363 including a molded solid surface 320 and ferrous particles 330 according to an exemplary embodiment of the present disclosure. FIG. 2 illustrates a front view of the apparatus 363 comprising a molded solid surface 320 and ferrous particles 330 injection molded within a portion of the molded solid surface formed of resinous material. The molded solid surface 320 and ferrous particles 330 may be the same as those discussed above with reference to apparatus 105 and FIG. 1. The resinous material may be the same as that discussed above with respect to apparatus 105 and FIG. 1. As illustrated in FIG. 2, the ferrous particles 330 create a docking location 310 in the molded solid surface 320.

The docking location 310 formed by the ferrous particles 130 in the portion of the molded solid surface 320 formed of resinous material is configured to secure (e.g., mount) an accessory including a magnet to the molded solid surface 320. In some embodiments, the accessory may be a soap dispenser, or a container configured to store a kitchen or bathroom implement. In some embodiments, the accessory may be a kitchen appliance, such as a coffee maker, a toaster, a toaster oven, and the like. In some embodiments, the accessory may be a kitchen accessory such as a cutting board, a knife block, a trivet, and the like. A kitchen implement may be one of a knife, a fork, a spoon, a cooking utensil (e.g., a spatula, a whisk, etc.), and the like. In some embodiments, the accessory may be a bathroom appliance such as a toothbrush (or toothbrush stand), a hair dryer, an electric razor, or the like. A bathroom implement may be one of a toothbrush, a brush, a comb, tweezers, cotton swabs, and the like. In some embodiments, the accessory may be a vanity and the apparatus may be configured to secure itself to the top of the vanity. For example, the apparatus may be a countertop and the countertop may be configured to secure itself to the vanity (e.g., during installation of the countertop. In some embodiments, the docking location 310 may be visible within the molded solid surface 320.

In some embodiments, the docking location 310 may not be visible within the molded solid surface 320. A cross section of the apparatus 363 taken along line 340 illustrates the ferrous material 330 is located near a surface 325 of the molded solid surface 320. The ferrous material 330 located near the surface 325 of the molded solid surface 320 may form the docking location 310. The apparatus 363 may be configured to secure an accessory including a magnet to the molded solid surface 320. The magnet in the accessory may be attracted to the ferrous material 330 in the apparatus 363, thereby securing the accessory to the molded solid surface 320. In some embodiments, a magnet may be included in the apparatus 363 and the accessory may include a ferromagnetic material.

In some embodiments, magnetic components (e.g., permanent magnets) may be embedded in the molded solid surface. Magnetic components may be embedded in the molded solid surface to secure (e.g., mount) accessories including ferrous components to the molded solid surface. Accordingly, a molded solid surface including a magnet embedded therein may be configured to secure (e.g., mount) any of the accessories described above or below as including a magnet by including a ferrous material in the accessory described as including a magnet. For example, a soap dispenser including a ferrous component, or a container configured to store a kitchen, or a bathroom implement including a ferrous component may be secured or mounted to a molded solid surface including a magnet embedded therein. In some embodiment, objects including ferrous components may be secured to a molded solid surface including a magnet embedded therein. For example, pens, paper clips, and the like may be secured to the molded solid surface. In some embodiments, a molded solid surface may include both ferrous particles 330 and a magnetic component.

In some embodiments, the molded solid surface may be one of a tile. In embodiments where the molded solid surface is one of a tile, the docking location formed in the tile may be configured to secure an accessory including a magnet to the tile. For example, a shelf, a dispenser (e.g., a soap dispenser, a shampoo dispenser, a conditioner dispenser, and the like), or a container configured to store a kitchen and/or bathroom implement may be secured to the tile. In other embodiments, the docking location formed in the tile may be configured to secure a mat, a rug, a garbage can, or a toilet brush holder.

In some embodiments where the molded solid surface is one of a sink, the molded solid surface may form the basin of the sink. In embodiments where the basin of a sink has a rectangular or substantially rectangular shape, the mold solid surface may form the bottom and/or walls of the basin. In some embodiments, the molded solid surface may be a strainer, strainer basket, or drain stopper for a sink. Accordingly, a predetermined pattern may be formed in any of the basin, walls, bottom, strainer, strainer basket and/or stopper. Similarly, a docking location may be formed in any of the basin, walls, bottom, strainer, strainer basket, and/or stopper for a sink. For example, a docking location on the basin and/or wall of the sink may be configured to secure an accessory such as a basket for holding a sponge, soap, or the like. In another example, the strainer may be configured to secure a strainer basket and/or stopper.

In some embodiments, where the molded solid surface is one of a toilet, the molded solid surface may form one or more parts of a flush engine for a toilet, for example, an interior of the bowl, a rim, sump, and or trapway and the like. In other embodiments, the molded solid surface may one or more parts of a surrounding shell of the toilet, for example, a shroud, pedestal, cover, and the like. The cover may be configured to cover an exterior surface of the bowl, sump, trapway, and the like. In some embodiments, the molded solid surface may form one or more components of the surrounding shell and may be over molded on an outer surface of the flush engine. In some embodiments, the molded solid surface may form a tank or cover for a toilet tank. Accordingly, a predetermined pattern may be formed in an interior of the bowl, rim, sump, trapway, shroud, pedestal, cover, tank, or tank cover. Similarly, a docking location may be formed in an interior of the bowl, rim, sump, trapway, shroud, pedestal, cover, tank, or tank cover. For example, a docking location may be formed in the interior of the toilet bowl to dispense a cleaning agent into the bowl. In another example, a docking location may be formed in the tank cover to secure an air freshener or the like to the tank cover.

In some embodiments where the molded solid surface is one of a faucet, the molded solid surface may be one or more surfaces of the faucet body and/or faucet handle. In some embodiments, the faucet body may be configured to receive a faucet handle and/or a plumbing network (e.g., internal waterways, aerator, valve system, valve cartridge). For example, the faucet body may extend vertically concealing portions of the plumbing network (e.g., an internal waterway and/or a valve system) and may extend horizontally and/or vertically concealing another portion of the plumbing network (e.g., a faucet spout). In other embodiments, the faucet body may be formed around the valve cartridge and plumbing network, for example, via injection molding, compression molding, resin transfer molding (RTM), gravity casting, and the like. The faucet body may be configured to give the faucet a desirable finish and/or aesthetic (e.g., shape, texture, color, etc.). Accordingly, a predetermined pattern may be formed in the faucet body and/or the faucet handle. Similarly, a docking location may be formed in the faucet body and/or the faucet handle. For example, a docking location may be formed in the faucet body to secure a water filter or the like to the end of a faucet.

Figure 3:
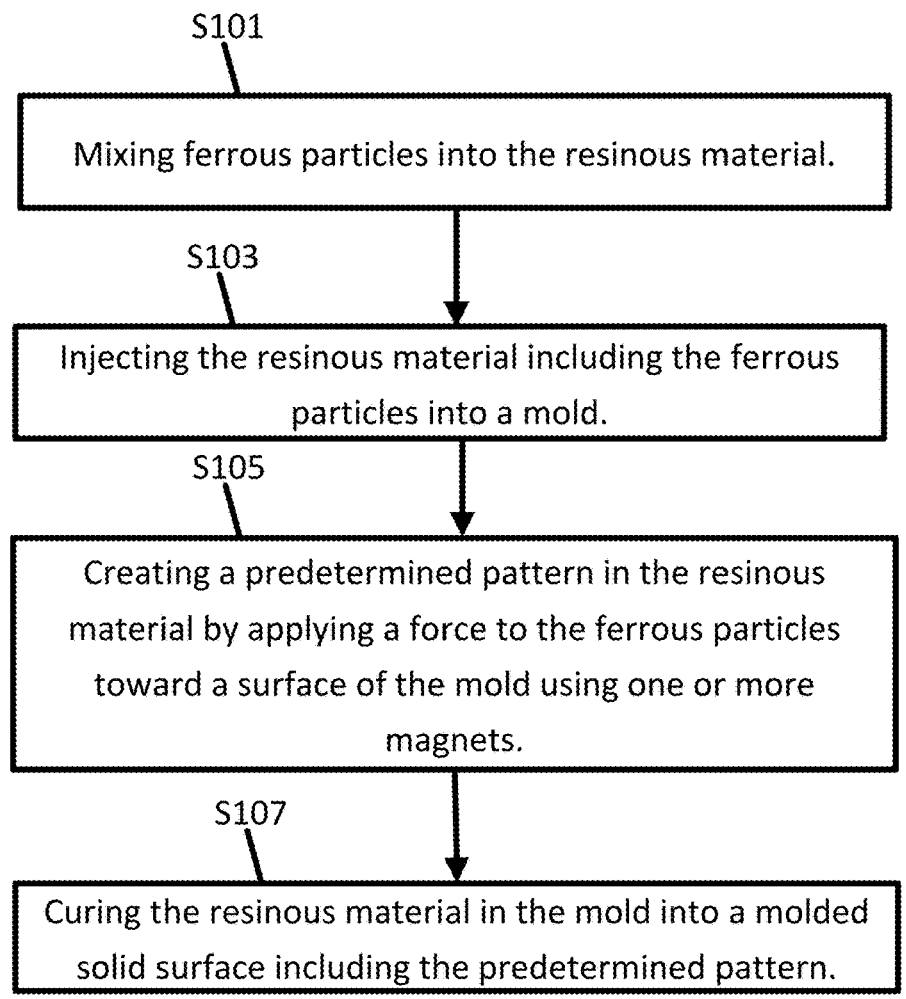
FIG. 3 illustrates a flow chart for manufacturing a molded solid surface according to an exemplary embodiment of the present disclosure.

FIG. 3 illustrates a flow chart for manufacturing a molded solid surface according to an exemplary embodiment of the present disclosure. The various systems and apparatuses disclosed herein may employ the method of FIG. 3. Additional different or fewer acts may be provided.

At act S101, ferrous particles are mixed into the resinous material. The ferrous particles and resinous material may be the same as those discussed above with respect to FIGS. 1 and 2. At act S101, the resinous material may be in a liquid phase and comprise a mixture of two or more liquids. For example, one of the liquids may include the epoxy groups used and another liquid may be a hardener (e.g., an epoxy curing agent). The ferrous particles may be mixed into the resinous material while the resinous material is in a liquid phase. The ferrous particles may be mixed into the resinous material such that they are distributed throughout the resinous material. In some embodiments, a filler material and/or a colorant may further be mixed into the resinous material.

At act S103, the resinous material including the ferrous particles is injected into a mold. The mold may comprise a top mold half and a bottom mold half. At act S103, the mold may be closed, such that the top mold half and the bottom mold half form a sealed, enclosed space having the desired shape of the molded solid surface. For example, the desired shape may be one of a countertop, tile, wall, floor, toilet, faucet, and the like. The resinous material including the ferrous particles may be injected into the mold through an injection channel. The injection channel may be fluidly connected the top half and/or the bottom half of the mode such that the interior of the molded is filled with the resinous material including the ferrous particles during injection. The resinous material including the ferrous particles may be injected into the mold under pressure such that the entire interior of the mold is filled.

At act S105, a predetermined pattern is created in the resinous material by applying a force to the ferrous particles toward a surface of the mold using one or more magnets. One or more magnets may be provided in the mold or proximate to the mold such that the magnets apply a magnetic force to the ferrous particles in the resinous material after the resinous material is injected into the mold. The one or more magnets may be configured to apply a force to the ferrous particles such that the ferrous particles accumulate at specific locations near a surface of the mold. The one or more magnets may be one of permanent magnets and electromagnets. The one or more magnets may have specific intensities (e.g., create a magnetic field of a certain strength) and be placed at specific locations relative to the mold such that a predetermined pattern is created in the resinous material (and subsequently the molded solid surface) by moving (e.g., pulling, pushing, drawing) the ferrous particles toward a surface of the mold using the applied magnetics force. In some embodiments, the ferrous particles may be moved toward a surface of the mold as to be visible within the molded solid surface proximate to the surface of the mold toward which the ferrous particles are moved (i.e., visible concentrations of ferrous particles may be formed). Areas of the molded solid surface corresponding to areas in the mold in which the ferrous particles are moved toward a surface of the mold may have a relatively dark shade due to a relatively high concentration of ferrous particles. In some embodiments, the ferrous particles may be moved away from a surface of the mold as to not be visible within the molded solid surface proximate to the surface of the mold from which the ferrous particles are moved away from (i.e., all visible particles may be removed from an area). Areas of the molded solid surface corresponding to areas in the mold in which the ferrous particles are moved away from a surface of the mold may have a relatively light shade due to a relatively low concentration of ferrous particles. In some areas of the mold particles may not be moved toward or away from a surface of the mold. Areas of the molded solid surface corresponding to areas of the mold where the ferrous particles are neither moved toward or away from a surface of the mold may have a medium shade due to the medium concentration of ferrous particles. In some embodiments, the ferrous particles may be moved toward a surface of the mold in some areas, moved away from the same surface of the mold in other areas, and not moved toward or away from the same surface in different areas. Accordingly, a predetermined pattern including three different shades may be formed in the molded solid surface. The one or more magnets may be configured to apply a force the ferrous particles such that the ferrous particles remain a specified distance away from a surface of the mold. The resinous material may be transparent or semitransparent when cured and the ferrous particles may have a color different than that of the resinous material when cured such that a user may see the predetermined pattern created in the resinous material after the molded solid surface has cured.

In some embodiments, the one or more magnets may move toward and/or away from one of the upper mold half and the lower mold half to create the predetermined pattern. In some embodiments, the one or more magnets may move along a surface of one of the upper mold half and the lower mold half to form the predetermined pattern. In some embodiments, the one or more magnets may move along a plane perpendicular to a surface of one of the upper mold half and the lower mold half to create the docking location.

At act S107, the resinous material including the ferrous particles is cured into the molded solid surface including the predetermined pattern. The resinous material may cure into an apparatus including a molded solid surface with ferrous particles forming a predetermined pattern injection molded within a portion of the molded solid surface formed from a resinous material. In some embodiments, the resinous material may begin curing during creation of the predetermined pattern (act S105). In some embodiments, the resinous material may be cured at an elevated temperature. For example, one of the upper mold half and the lower mold half may be at an elevated during injection molding (act S103), creation of the predetermined pattern (act S105), and curing of the resinous material (act S107).

The resinous material may be cured into a transparent or semitransparent molded solid surface such that predetermined pattern comprising the ferrous particles is visible within the molded solid surface. The resinous material may be configured such that the molded solid surface has specific color after curing. The resinous material may be configured such that the cured molded solid surface has desirable surface characteristics (e.g., stain resistance, heat resistance, abrasion resistance, and the like).

In some embodiments, the method of manufacturing a molded solid surface further includes separating the upper mold half and the lower mold half and removing the molded solid surface from one of the upper mold half and the lower mold half.

Figure 4:
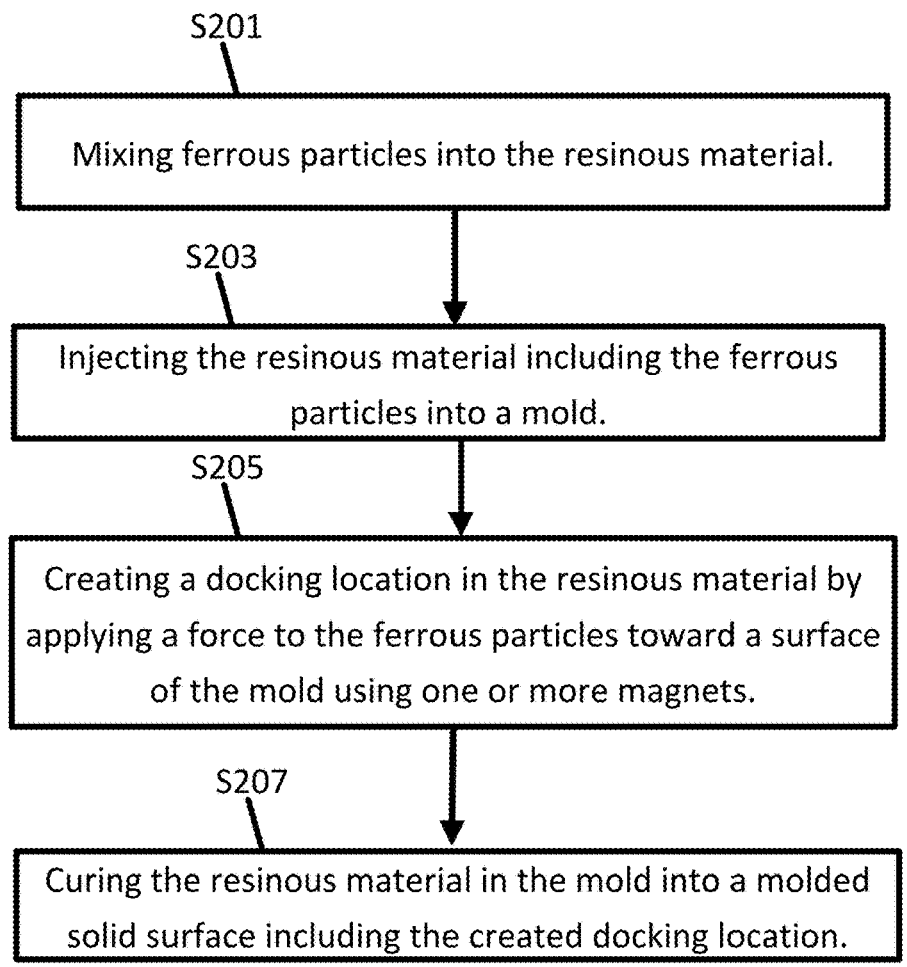
FIG. 4 illustrates a flow chart for manufacturing a molded solid surface according to an exemplary embodiment of the present disclosure.

FIG. 4 illustrates a flow chart for manufacturing a molded solid surface according to an exemplary embodiment of the present disclosure. The various systems and apparatuses disclosed herein may employ the method of FIG. 4. Additional different or fewer acts may be provided.

At act S201, ferrous particles are mixed into the resinous material. The ferrous particles and resinous material may be the same as those discussed above with respect to FIGS. 1-3. In some embodiments, act S201 may be the same as act S101 discussed above with respect to FIG. 3.

At act S203, the resinous material including the ferrous particles is injected into a mold. The mold may be the same as the mold discussed above with reference to FIG. 3. In some embodiments, the act S203 may be the same as the act S103 discussed above with respect to FIG. 3.

At act S205, a docking location is created in the resinous material by applying a force to the ferrous particles toward the surface of the mold using one or more magnets. The one or more magnets may be provided in one of the upper mold half and the lower mold half or proximate to one of the upper mold half and the lower mold half. The one or more magnets may be one of permanent magnets and electromagnets. In some embodiments, the one or more magnets may move toward and/or away from one of the upper mold surface and the lower mold surface to create the docking location. In some embodiments, the one or more magnets may move along a surface of one of the upper mold surface and the lower mold surface or along a plane perpendicular to a surface of one of the upper mold half and the lower mold half to create the docking location.

The one or more magnets may be configured to apply a magnetic force to the ferrous particles in the resinous material toward a surface of one of the upper mold half and the lower mold half. The one or more magnets may be configured to apply a magnetic force to the ferrous particles so that the ferrous particles accumulate at one or more locations forming the docking location. The one or more magnets may have specific intensities (e.g., create a magnetic field of a certain strength) and be placed at specific locations relative to the mold such that the docking location is created in the resinous material (and subsequently the molded solid surface) by moving (e.g., pulling, pushing, drawing) the ferrous particles toward a surface of the mold using the applied magnetics force. The one or more magnets may be configured to apply a force the ferrous particles such that the ferrous particles remain a specified distance away from a surface of the mold. The magnets may be configured to apply a force to the ferrous particles such that a magnet in an accessory may secure the accessory to the ferrous particles of a cured molded solid surface. In some embodiments, the resinous material may be transparent or semitransparent when cured.

At act S207, the resinous material including the ferrous particles is cured into the molded solid surface including the docking location. In some embodiments, the act S207 may be the same as the act S107 discussed above with respect to FIG. 3. The resinous material may cure into the molded solid surface such that a magnet included in an accessory is attracted to the ferrous particles in the molded solid surface such that the accessory is secured to the molded solid surface. The resinous material may be configured such that the cured molded solid surface has desirable surface characteristics (e.g., stain resistance, heat resistance, abrasion resistance, and the like). In some embodiments, the docking location may be visible within the molded solid surface.

In some embodiments, the method of manufacturing a molded solid surface further includes separating the upper mold half and the lower mold half and removing the molded solid surface from one of the upper mold half and the lower mold half.

Figure 5:
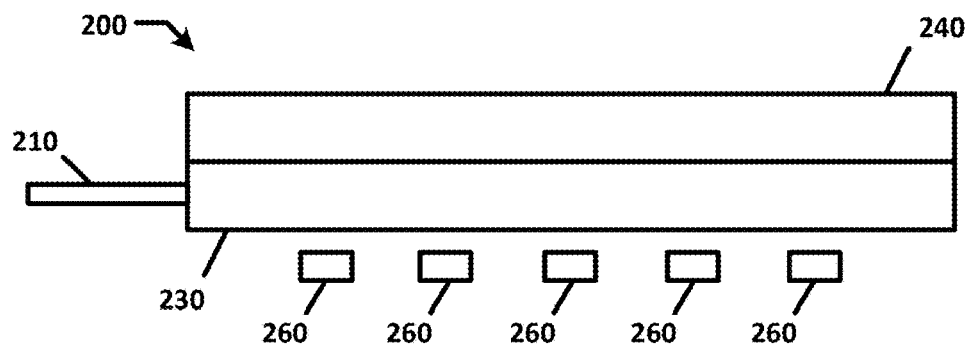
FIG. 5 illustrates a method for manufacturing a molded solid surface according to an exemplary embodiment of the present disclosure.
Figure 5:
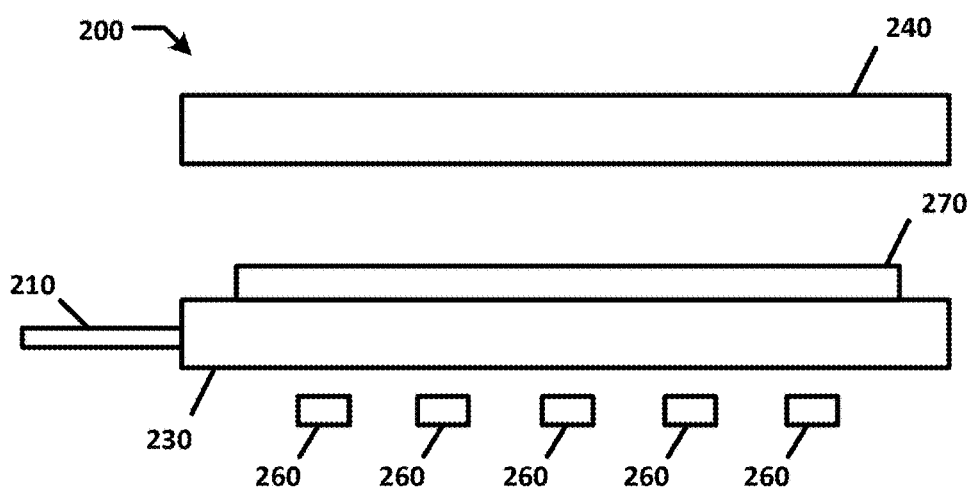
Figure 5:
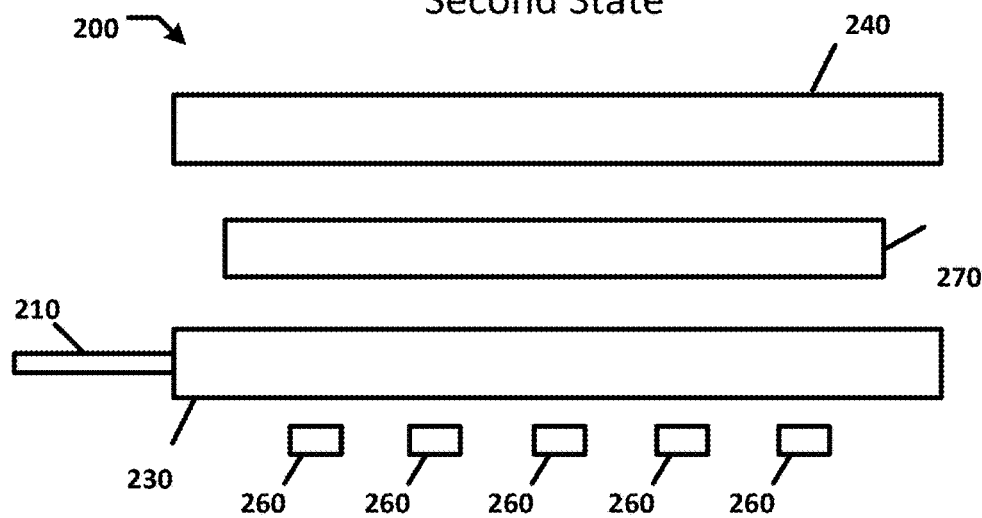

FIG. 5 illustrate one non-exclusive exemplary method of manufacturing a molded solid surface according to an exemplary embodiment of the present disclosure. The system 200 for manufacturing a molded solid surface as illustrated in FIG. 5 includes an injection channel 210, mold lower half 230, mold upper half 240, magnets 260, and molded solid surface 270. The injection channel 210 may be fluidly coupled to one of the lower mold half 230 and the upper mold half 240. The injection channel may be configured to supply a flow of resinous material including ferrous particles to one of the lower mold half 230 and the upper mold half 240. The lower mold half 230 and the upper mold half 240 may be removably coupled to one another. When coupled together, the lower mold half 230 and the upper mold half 240 may form a sealed, enclosed interior. The sealed, enclosed interior of the lower mold half 230 and the upper mold half 240 may form a desired shape of the molded solid surface. The desired shape of the molded solid surface may be one of a countertop, tile, wall, floor, toilet, and the like. The magnets 260 may be configured to apply a force to the ferrous particles toward a surface of one of the lower mold half 230 and the upper mold half 240. The magnets 260 may be configured to create a predetermined pattern and/or a docking location in the resinous material (and subsequently the molded solid surface after curing of the resinous material).

FIG. 5 illustrates the system 200 for manufacturing a molded solid surface including ferrous particles in a first state. In the first state, the lower mold half 230 and the upper mold half 240 are coupled to one another forming the sealed, enclosed interior having the desired shape of the molded solid surface. As illustrated in FIG. 1, the injection channel is fluidly coupled to the lower mold half 230. In other embodiments, the injection channel may be fluidly coupled to either the upper mold half 240 or both the lower mold half 230 and the upper mold half 240. In the first state, a mixture of resinous material and ferrous particles is supplied (e.g., injected) to the mold (i.e., the lower mold half 230 and the upper mold half 240) through the injection channel. The mixture of resinous material and ferrous particles may be supplied to the mold under pressure, filling the entire interior of the lower mold half 230 and the upper mold half 240 coupled to one another.

Additionally, in the first state, after the interior of the mold has been filled with the mixture of resinous material and ferrous particles, a predetermined pattern and/or a docking location comprising the ferrous particles may be formed in the resinous material. The magnets 260 may apply a magnetic force to the ferrous particles, moving (e.g., pushing, pulling) the ferrous particles toward a surface of the mold. As described above with respect to acts S105 and S205 of FIGS. 3 and 4 respectively, a magnetic force may be applied by the magnets during the first state, creating a predetermined pattern and/or a docking location in the resinous material.

Finally, in the first state, after a predetermined pattern and/or a docking location has been formed in the resinous material, the resinous material may cure into the molded solid surface including the predetermined pattern and/or the docking location. The resinous material may cure into the molded solid surface as described with respect to acts S107 and S207 of FIGS. 3 and 4 respectively. In some embodiments, one of the lower mold half and the upper mold half may further include heating elements configured to heat the lower mold half 230 and/or upper mold half 240. In some embodiments, the lower mold half 230 and/or the upper mold half 240 may be heated to increase the rate at which the resinous material cures. In other embodiments, one of the lower mold half 230 and/or the upper mold half 240 may be heated to increase the ductility of the resinous material entering the mold. In other embodiments, the resinous material may cure at room temperature. In some embodiments, a UV light may be applied to the resinous material to facilitate curing of the resinous material.

FIG. 5 illustrates the system 200 for manufacturing a molded solid surface including ferrous particles in in a second state. In the second state, the lower mold half 230 and the upper mold half 240 are no longer coupled to one another. In the second state, the molded solid surface 270 including the predetermined pattern and/or docking location formed (e.g., manufactured) in the first state is visible. In the second state, a portion of the molded solid surface 270 is in the mold lower half 230. The resinous material may be configured such that the molded solid surface 270 may have desirable surface characteristics (e.g., visible predetermined pattern, stain resistance, heat resistance, abrasion resistance, and the like).

FIG. 5 illustrates the system 200 for manufacturing the molded solid surface including ferrous particles in the third state. In the third state, the molded solid surface 270 has been removed from the mold lower half 230. As illustrated in the system 200, the molded solid surface 270 is planar. The molded solid surface 270 as illustrated in the embodiment of FIG. 5 may be one of a countertop, a tile, a wall, a floor, and the like. In other embodiments, the molded solid surface may be one of a toilet and a faucet. In other embodiments, the molded solid surface may be any surface capable of being molded using the resinous material.

Figure 6:
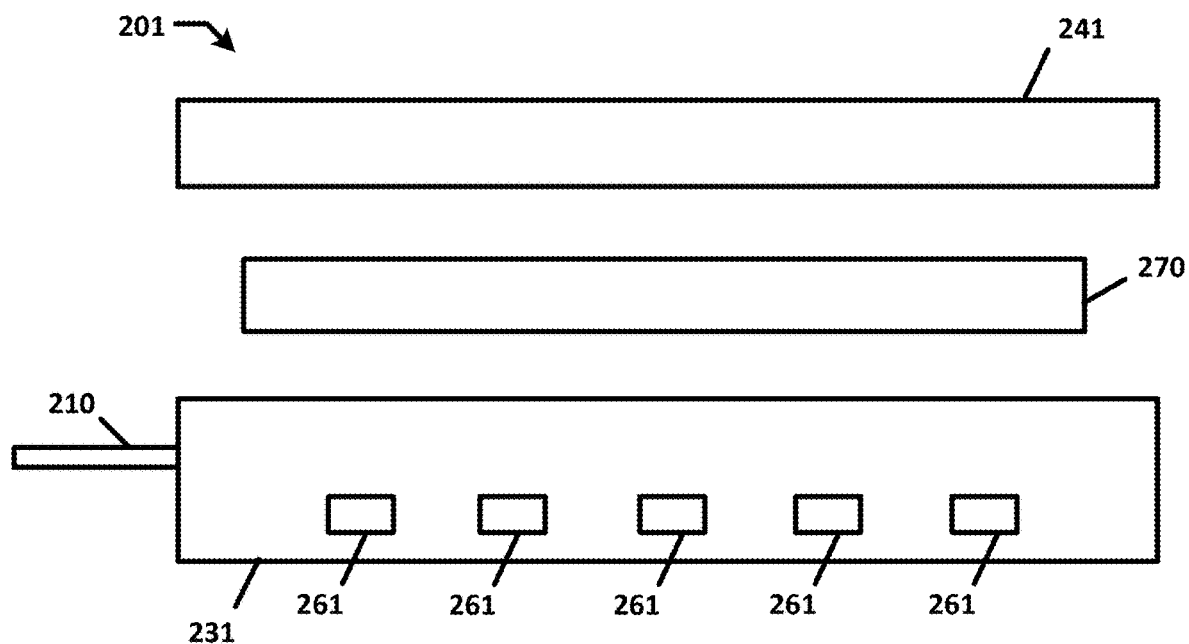
FIG. 6 illustrates a system for manufacturing a molded solid surface according to an exemplary embodiment of the present disclosure.

FIG. 6 illustrates a system 201 for manufacturing a molded solid surface including ferrous particles according to an embodiment of the present disclosure. The system 201 incudes injection channel 210, mold lower half 231, mold upper half 241, magnets 261, and molded solid surface 270. The injection channel 210, mold upper half 241, and molded solid surface 270 of FIG. 6 may be the same as those discussed above with respect to FIG. 5. The mold lower half 231 as illustrated in the embodiment of FIG. 6 includes magnets 261. The magnets 261 in the embodiment of FIG. 6 may be permanent magnets. The mold lower half 231 may include a gridwork in which the magnets 261 are inserted. The gridwork may include various location at which magnets may be inserted to create different predetermined patterns and/or docking locations in the molded solid surface.

Figure 7:
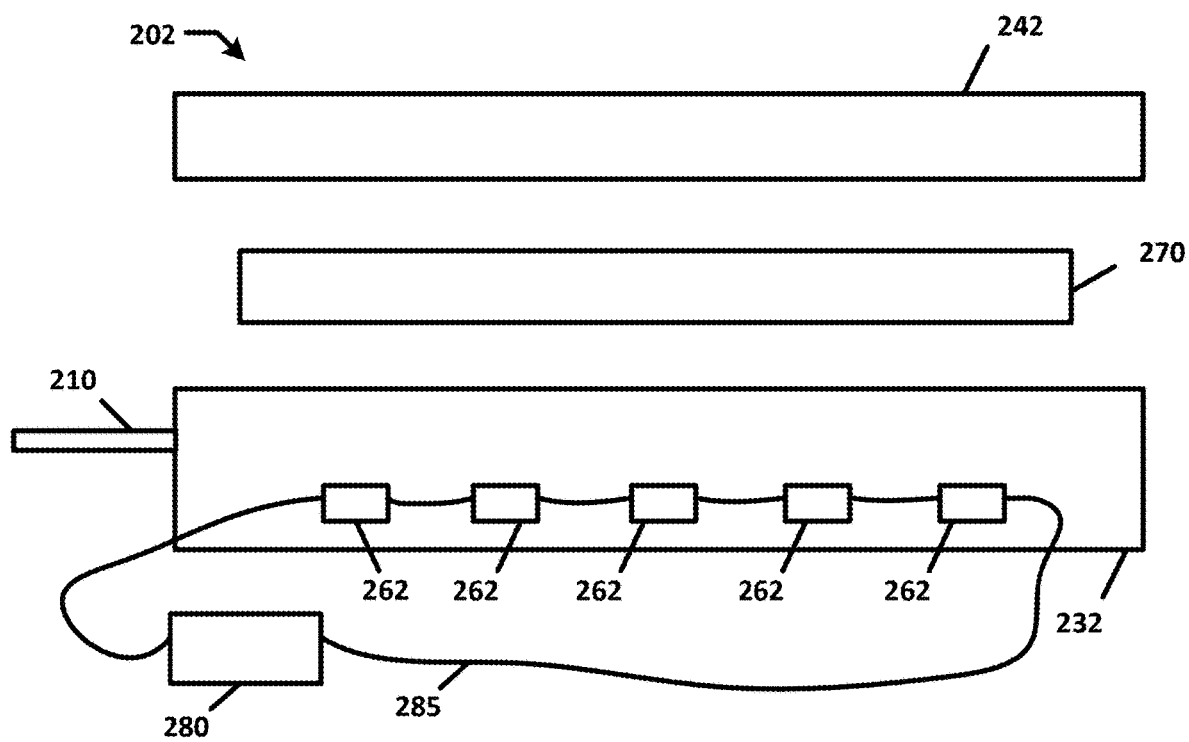
FIG. 7 illustrates a system for manufacturing a molded solid surface according to an exemplary embodiment of the present disclosure.

FIG. 7 illustrates a system 202 for manufacturing a molded solid surface including ferrous particles according to an embodiment of the present disclosure. The system 202 incudes injection channel 210, mold lower half 232, mold upper half 242, magnets 223, power source 280, wire 285, and molded solid surface 270. The injection channel 210, mold upper half 242, and molded solid surface 270 of FIG. 7 may be the same as those discussed above with respect to FIG. 5. FIG. 7 further includes mold lower half 232 including magnets 262, power source 280 and wire 285. In other embodiments, the magnets 261 may be located in the mold upper half 241.

The lower mold half 322 in the embodiment of system 202 includes magnets 262. The magnets 262 in the embodiment of system 202 may be electromagnets. The electromagnets 262 may be connected to one another and power source 280 by wire 285. The power source 280 may be configured supply a specific current or range of currents to the electromagnets so that the electromagnets have a desired intensity (e.g., create a magnetic field of a desired strength). In some embodiments, the power source may be one supplying either direct or alternating current. In some embodiments, the power source may be a battery. In other embodiments, wire 285 may be plugged into a power source such as a wall outlet. In some embodiments, the lower mold half may include two or more electromagnetic circuits configured to create different predetermined patterns and/or docking locations in the molded solid surface 270. In some embodiment, the magnets 262 connected to the power source 280 via wire 285 may be in the mold upper surface 252.

Figure 8:
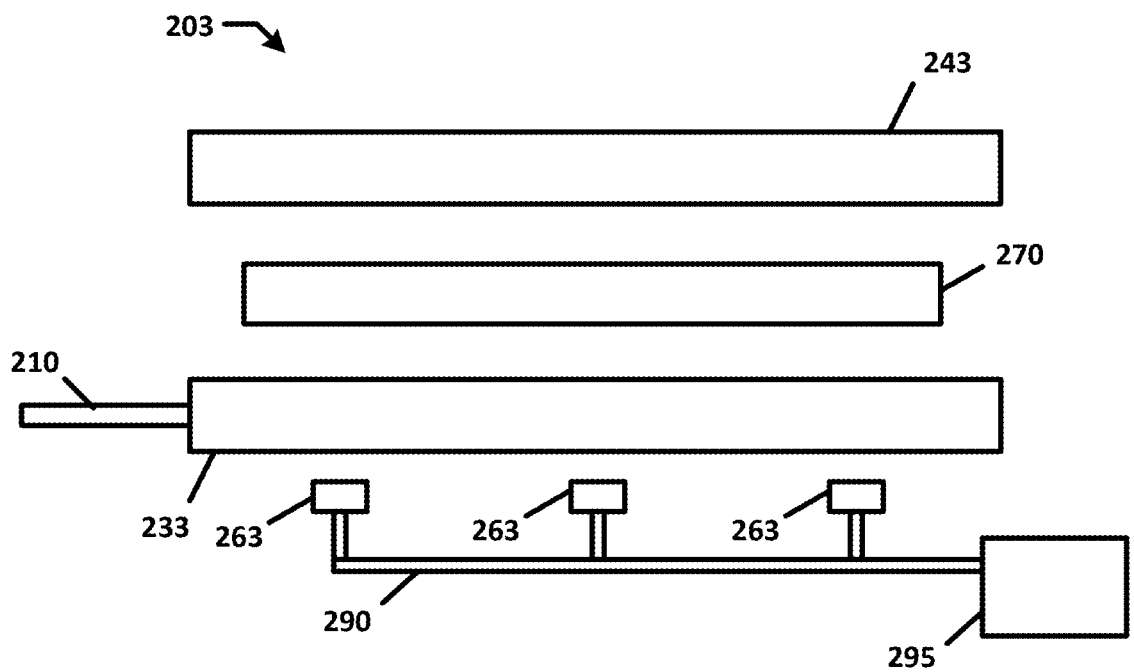
FIG. 8 illustrates a system for manufacturing a molded solid surface according to an exemplary embodiment of the present disclosure.

FIG. 8 illustrates a system 203 for manufacturing a molded solid surface including ferrous particles according to an embodiment of the present disclosure. The system 203 incudes injection channel 210, mold lower half 233, mold upper half 243, magnets 263, arm 290, and actuator 295. The injection channel 210, mold lower half 233, mold upper half 243, and molded solid surface 270 may be the same as those discussed above with respect to FIG. 5. The system 203 further includes arm 290 connecting magnets 263 and actuator 295. The magnets 263 in the embodiment of system 203 may be one of permanent magnets and electromagnetic magnets. The actuator 295 may be one of a motor or a solenoid. The actuator 295 is configured to move the arm 290 and thus the magnets 263 relative to the mold lower half 233 and the mold upper half 233. For example, the actuator 295 may move the arm 290 and thus the magnets 263 through a prescribed path to create a predetermined pattern and/or docking location by applying a force to the ferrous particles toward a surface of the mold as the magnets 263 move along the prescribed path. In some embodiments, the magnets 263, arm 290, and actuator 295 may be located on the other side of the mold near the mold upper half 243. In some embodiments, the actuator 295 may be configured to move the arm 290 and magnets 263 towards and/or away from the lower mold half 233. In some embodiments the actuator 295 may be configured to move the magnets 263 along a plane that is parallel to a surface of the lower mold half 233. The system 203 may create a predetermined pattern and/or a docking location in the resinous material (and subsequently the molded solid surface) as the actuator moves the magnets relative to the mold.

Figure 9:
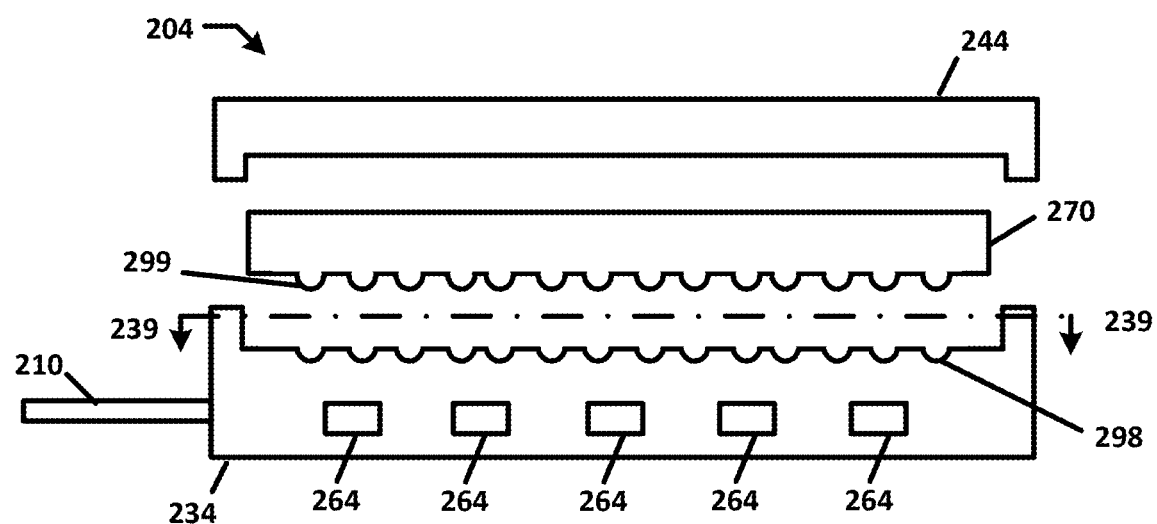
FIG. 9 illustrates a cross section of a system for manufacturing a molded solid surface according to an exemplary embodiment of the present disclosure.

FIG. 9 illustrates a cross section of a system for manufacturing a molded solid surface including ferrous particles according to an exemplary embodiment of the present disclosure. The system 204 includes injection channel 210, mold lower half 234, mold upper half 244, and magnets 264. The injection channel 210 and magnets 264 may be the same as those discussed above with respect to FIG. 5. As shown in FIG. 9, the mold lower half includes dimples 298 formed therein. In some embodiments, the dimples 298 may be formed in the upper mold half 244. In other embodiments, the dimples 298 may be formed in both the lower mold half 234 and the upper mold half 244. The dimples 298 may correspond to protrusions 299 formed in the molded solid surface 270.

In the system 204, the magnets may cause the ferrous particles to move into the dimples formed in the lower mold half 234 and/or the upper mold half 244. In some embodiments, the magnets 264 may push the ferrous particles into the dimples 298. Accordingly, after the resinous material cures, a relatively high concentration of ferrous particles may be located in the protrusions 299 formed in the molded solid surface 270. The protrusions 299 may have a relatively dark shade due to the high concentration of ferrous particles in the protrusions 299. In other embodiments, the magnets 264 may pull the ferrous particles into the dimples 298. In some embodiments, the magnets 264 may be located within the lower mold half 234 and/or the upper mold half 244. In other embodiments, the magnets 264 may be located proximate to the lower mold half 234 and/or the upper mold half 244.

Figure 10:
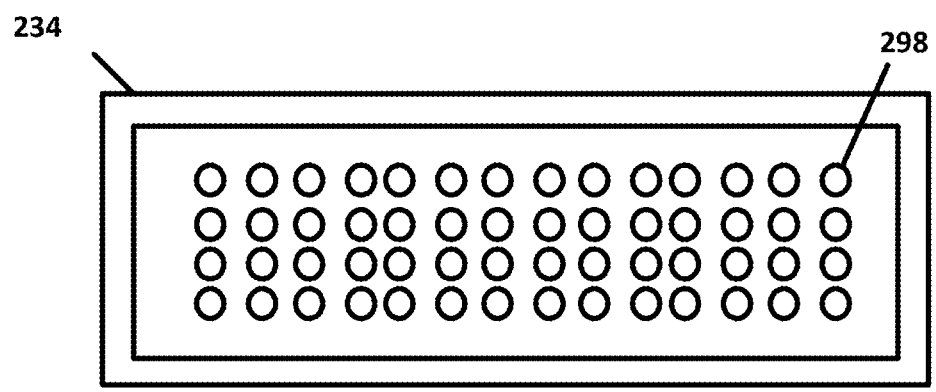
FIG. 10 illustrates a cross section view of the system of FIG. 9.

FIG. 10 illustrates a cross section view of the system 204 of FIG. 9 taken along line 239. The dimples 298 formed in the lower mold half 234 and/or the upper mold half 244 may be configured to create a preconfigured texture and/or geometric pattern in the molded solid surface 270. As shown in FIG. 10, the location of the dimples 298 formed in the lower mold half 234 and/or the upper mold half 244 may correspond to the preconfigured texture and/or geometric pattern in the molded solid surface. Accordingly, after the resinous material has cured, the ferrous particles in the protrusions 299 may form the preconfigured texture and/or geometric pattern.

Figure 11:
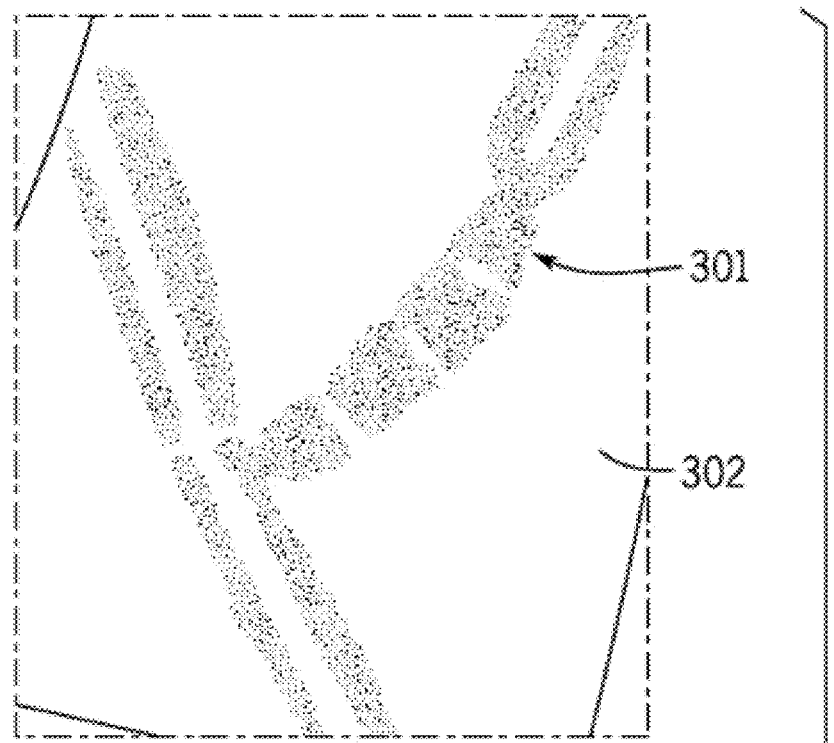
FIG. 11 illustrates a predetermined pattern on a molded solid surface and corresponding magnet configuration.
Figure 11:
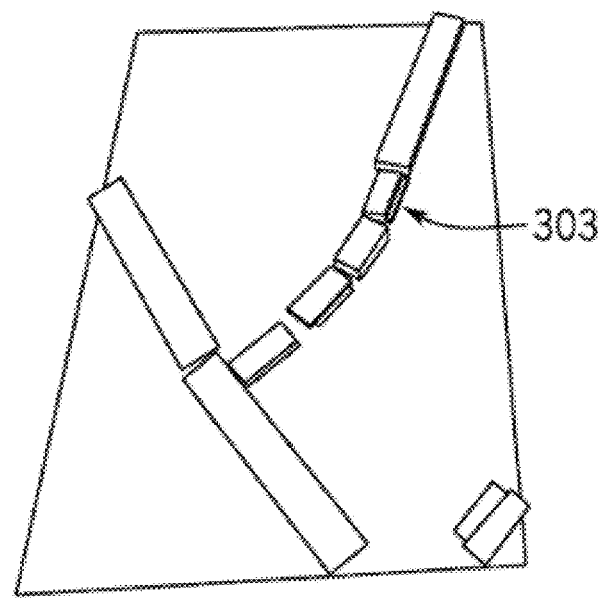

FIG. 11 illustrates a predetermined pattern 351 in a molded solid surface 302 according to an exemplary embodiment of the present disclosure. FIG. 11 further illustrates a magnet configuration 302 used to create the predetermined pattern 351 as illustrated in FIG. 9A.

Figure 12:
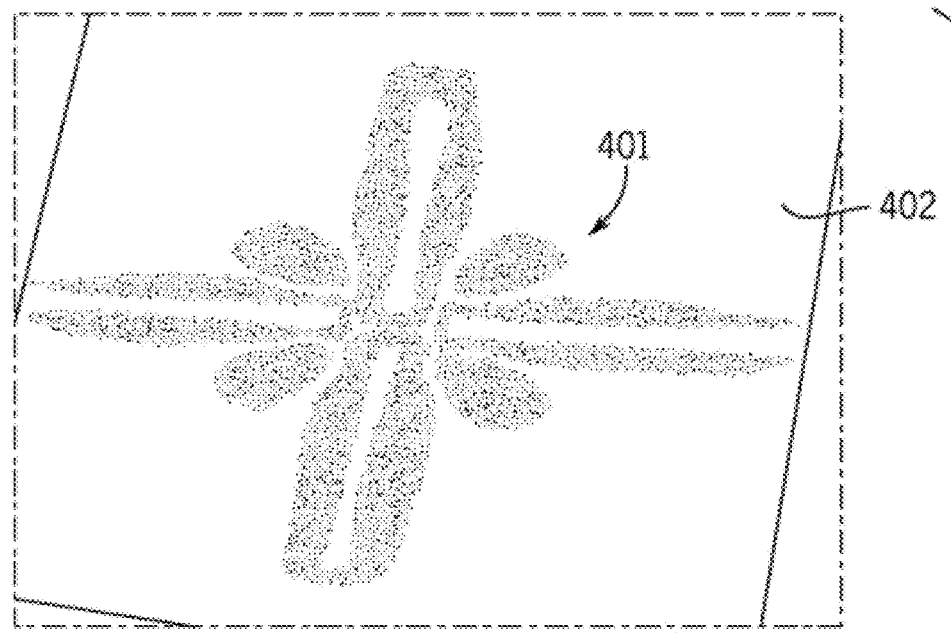
FIG. 12 illustrates a predetermined pattern on a molded solid surface a corresponding magnet configuration.
Figure 12:
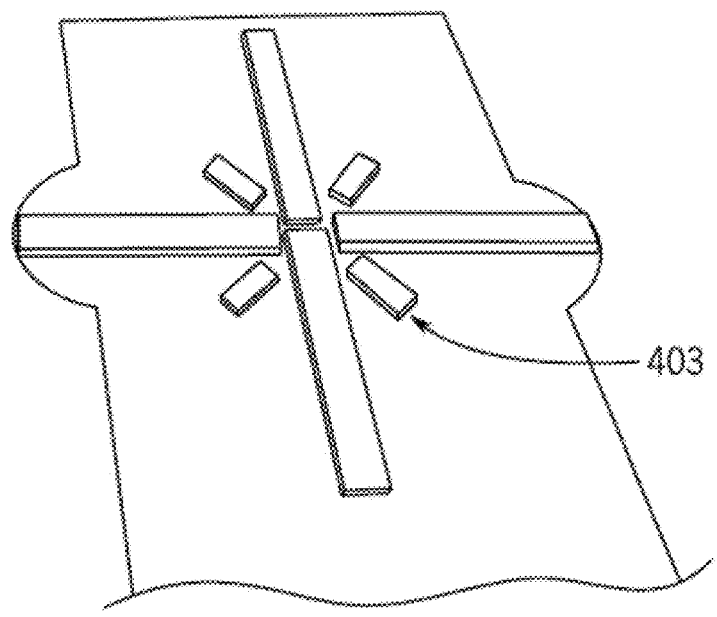

FIG. 12 illustrates a predetermined pattern 401 on a molded solid surface 402 according to an exemplary embodiment of the present disclosure. FIG. 12 illustrates a magnet configuration 403 used to create the predetermined pattern 401.

The example molded solid surface including ferrous particles according to any of the disclosed embodiments may be adapted for inductive heating. Foundry sand with the ferrous or magnetic material may be added to ceramic tiles that form a countertop for heating or another device or surface for heating. The ceramic tiles may be configured for operation as induction heaters. The molded solid surface including ferrous particles may be adapted for use in other heat-able surfaces such as of bath surfaces, shower surfaces, toilet seats, bidets, and shower seats.

An electric coil beneath ceramic tiles (e.g., within the countertop) generates an electromagnetic field that travels through the ferrous particles in the tile. The ferrous material may be heated through eddy currents, joule heating, and/or hysteresis losses. The ceramic tile may operate as a stovetop or other heating surface to heat pots or pans. That is, the ceramic tile is heated through induction heating, and the heat is applied to one or more objects placed in contact with the ceramic tile. The ceramic tile may operate as a warming tray to keep items warm. The ceramic tile may be used to dry the surface or other object (e.g, towels or clothes). The ceramic tile may be used to heat wax, potpourri, or other scented materials.

In another example, at least one magnet beneath the molded solid surface including ferrous particles (e.g., within the ceramic tile) includes an electromagnet. The electromagnet is powered to generate inductive heat via an electromagnetic field. The electromagnetic field is applied to an object placed on the molded solid surface in order to heat the object. The object may be a pot or pan adapted for inductive heating.

When a component, device, element, or the like of the present disclosure is described as having a purpose or performing an operation, function, or the like, the component, device, or element should be considered herein as being "configured to" meet that purpose or perform that operation or function.

The electromagnets may be connected to a power source configured supply a specific current or range of currents to the electromagnets so that the electromagnets have a desired intensity (e.g., create a magnetic field of a desired strength) under instructions, signals, or commands from the controller 222. In some embodiments, the power source may be one supplying either direct or alternating current. In some embodiments, the power source may be a battery. In other embodiments, the electromagnet may be electrically connected to a power source such as a wall outlet.

Figure 13:
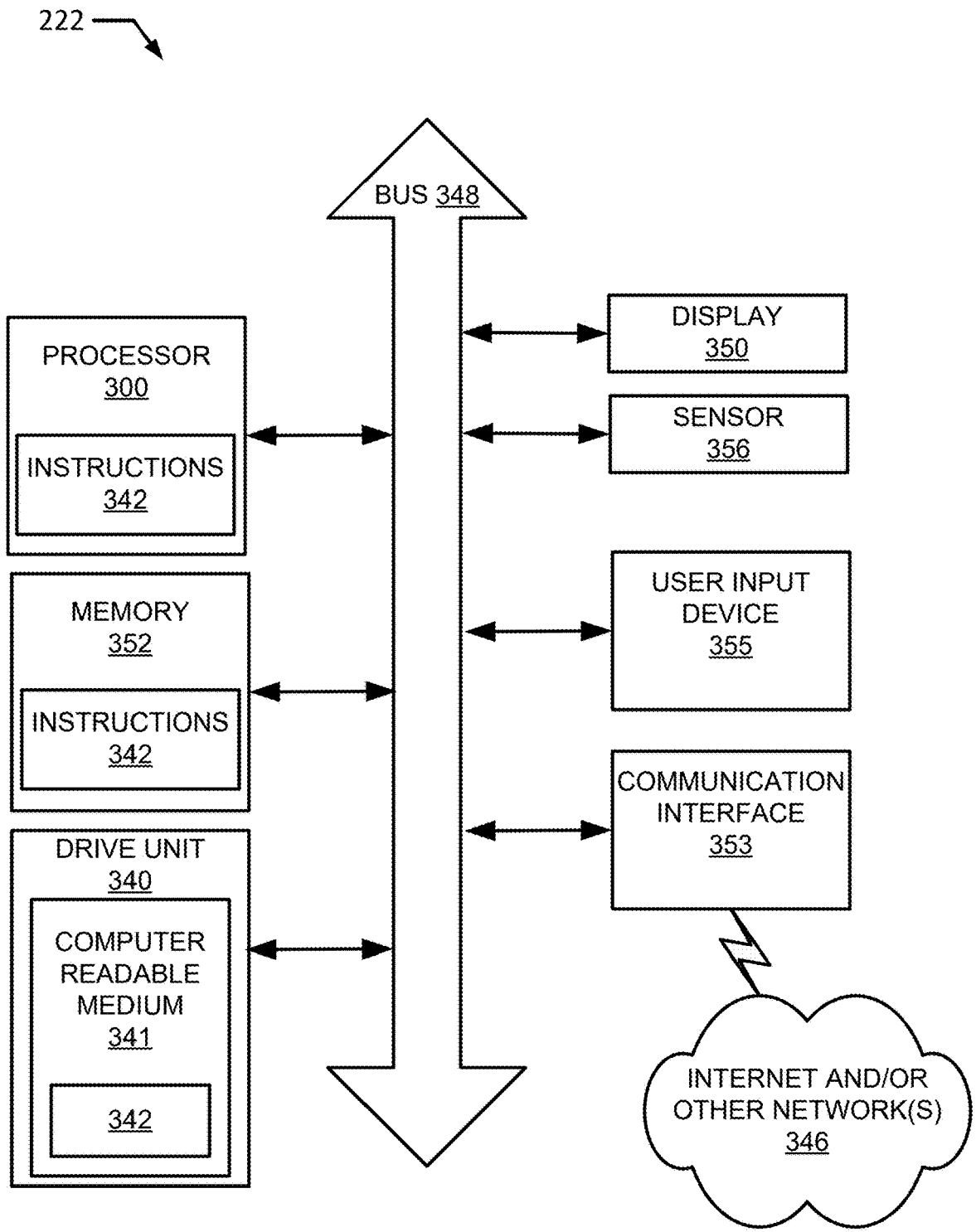
FIG. 13 illustrates an example controller for any of the electronic examples herein.

FIG. 13 illustrates an example control system or controller 222 for any of the embodiments described herein. The controller 222 may include a processor 300, a memory 352, and a communication interface 353 for interfacing with devices or to the internet and/or other networks 346. In addition to the communication interface 353, a sensor interface may be configured to receive data from the sensors described herein or data from any source. The components of the control system may communicate using bus 348. The control system may be connected to a workstation or another external device (e.g., control panel) and/or a database for receiving user inputs, system characteristics, and any of the values described herein.

The controller 222 may generate commands for the electromagnet in response to sensors (e.g., temperature sensors) such that a target temperature is commanded through a duty cycle or current provided to the electromagnet. The controller 222 may generate commands for the electromagnet in response to a predetermined pattern stored in memory 352 for the pattern 109. The electromagnetic may include an array of electromagnetic have a plurality of pattern components. The controller 222 selects the stored pattern from memory 352 and determined a subset of the plurality of electromagnetic pattern components to energize in order to provide pattern 109.

Optionally, the control system may include an input device 355 and/or a sensing circuit 356 in communication with any of the sensors. The sensing circuit receives sensor measurements from sensors as described above. The input device may include any of the user inputs such as buttons, touchscreen, a keyboard, a microphone for voice inputs, a camera for gesture inputs, and/or another mechanism.

Optionally, the control system may include a drive unit 340 for receiving and reading non-transitory computer media 341 having instructions 342. Additional, different, or fewer components may be included. The processor 300 is configured to perform instructions 342 stored in memory 352 for executing the algorithms described herein. A display 350 may be an indicator or other screen output device. The display 350 may be combined with the user input device 355.

Processor 300 may be a general purpose or specific purpose processor, an application specific integrated circuit (ASIC), one or more programmable logic controllers (PLCs), one or more field programmable gate arrays (FPGAs), a group of processing components, or other suitable processing components. Processor 300 is configured to execute computer code or instructions stored in memory 352 or received from other computer readable media (e.g., embedded flash memory, local hard disk storage, local ROM, network storage, a remote server, etc.). The processor 300 may be a single device or combinations of devices, such as associated with a network, distributed processing, or cloud computing.

Memory 352 may include one or more devices (e.g., memory units, memory devices, storage devices, etc.) for storing data and/or computer code for completing and/or facilitating the various processes described in the present disclosure. Memory 352 may include random access memory (RAM), read-only memory (ROM), hard drive storage, temporary storage, non-volatile memory, flash memory, optical memory, or any other suitable memory for storing software objects and/or computer instructions. Memory 352 may include database components, object code components, script components, or any other type of information structure for supporting the various activities and information structures described in the present disclosure. Memory 352 may be communicably connected to processor 300 via a processing circuit and may include computer code for executing (e.g., by processor 300) one or more processes described herein. For example, the memory 352 may include graphics, web pages, HTML files, XML files, script code, shower configuration files, or other resources for use in generating graphical user interfaces for display and/or for use in interpreting user interface inputs to make command, control, or communication decisions.

In addition to ingress ports and egress ports, the communication interface 353 may include any operable connection. An operable connection may be one in which signals, physical communications, and/or logical communications may be sent and/or received. An operable connection may include a physical interface, an electrical interface, and/or a data interface. The communication interface 353 may be connected to a network. The network may include wired networks (e.g., Ethernet), wireless networks, or combinations thereof. The wireless network may be a cellular telephone network, an 802.11, 802.16, 802.20, or WiMax network, a Bluetooth pairing of devices, or a Bluetooth mesh network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 352) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A method of manufacturing a molded solid surface, the method comprising:
    mixing ferrous particles into a resinous material;
    injecting the resinous material including the ferrous particles into a mold, the mold including an upper mold half and a lower mold half;
    creating a predetermined pattern in the resinous material by applying a force to the ferrous particles in the resinous material toward a surface of the upper mold half or the lower mold half using one or more magnets, such that visible concentrations of the ferrous particles accumulate near a surface of the mold creating the predetermined pattern; and
    curing the resinous material in the mold into the molded solid surface.

2. The method of claim 1, wherein the creating a predetermined pattern in the resinous material comprises:
    applying a force to the ferrous particles in the resinous material toward a surface of both the upper mold half and the lower mold half using the one or more magnets.

3. The method of claim 1, wherein after curing the molded solid surface is a transparent surface or a semitransparent surface.

4. The method of claim 1, wherein creating the predetermined pattern further comprises:
    moving the one or more magnets towards a surface of one of the upper mold half or the lower mold half; or
    moving the one or more magnets along a surface of the upper mold half or the lower mold half.

5. The method of claim 1, wherein the one or more magnets are disposed in one of the upper mold half and the lower mold half.

6. The method of claim 1, wherein one of the upper mold half and the lower mold half includes two or more electromagnetic circuits configured to create predetermined patterns in the resinous material.

7. The method of claim 1, further comprising:
    withdrawing the upper mold half from the lower mold half; and
    removing the molded solid surface from the lower mold half.

8. The method of claim 1, wherein the molded solid surface is a countertop, tile, wall, floor, sink, toilet, or faucet and the resinous material is one of an acrylic, polystyrene, urethane, polyester, epoxy, or hybrid composite.

9. The method of claim 1, wherein the molded solid surface is adapted for absorbing heat via induction.

10. A method of manufacturing a molded solid surface, the method comprising:
    mixing ferrous particles into a resinous material;
    injecting the resinous material including the ferrous particles into a mold, the mold including an upper mold half and a lower mold half;

creating a docking location in the resinous material by pulling the ferrous particles in the injection material toward a surface of one of the upper mold half and the lower mold half using one or more magnets, the one or more magnets applying a force to the ferrous particles, such that the ferrous particles accumulate near a surface of one of the upper mold half or the lower mold half, forming the docking location, and remain at least a predetermined distance away from the surface of the upper mold half or the lower mold half; and curing the resinous material in the mold into the molded solid surface, wherein the docking location is configured to secure an accessory including a magnet to the molded solid surface.

11. The method of claim 10, wherein the accessory is a soap dispenser or a container configured to store a kitchen or bathroom implement.

12. The method of claim 10, wherein the accessory is a vanity, and the molded solid surface is a countertop is configured to secure itself to a top of the vanity.

13. A method of manufacturing a molded solid surface, the method comprising:

mixing ferrous particles into a resinous material;

providing the resinous material including the ferrous particles into a mold; and creating a predetermined pattern in the resinous material by applying a force to the ferrous particles toward a surface of the mold using one or more magnets, such that visible concentrations of the ferrous particles accumulate near a surface of the mold creating the predetermined pattern.

14. The method of claim 13, further comprising:

curing the resinous material forming the molded solid surface, wherein the molded solid surface is transparent or semi-transparent.

15. The method of claim 13, wherein the one or more magnets are coupled to the mold.

16. The method of claim 13, wherein the one or more magnets are electromagnets.

17. The method of claim 13, wherein the resinous material including the ferrous particles is injection molded into the mold.

18. The method of claim 10, wherein the docking location is visible within the molded solid surface.

19. The method of claim 1, wherein:

one of the upper mold half and the lower mold half include one or more dimples; and the one or more magnets apply a force to the ferrous particles causing the ferrous particles to move into the one or more dimples.

20. The method of claim 13, wherein:

one of the upper mold half and the lower mold half include one or more dimples; and the one or more magnets apply a force to the ferrous particles causing the ferrous particles to move into the one or more dimples.

* * * * *